Sept. 29, 1925.
O. A. COLBY
1,555,272
RADIANT HEATER
Filed May 24, 1923
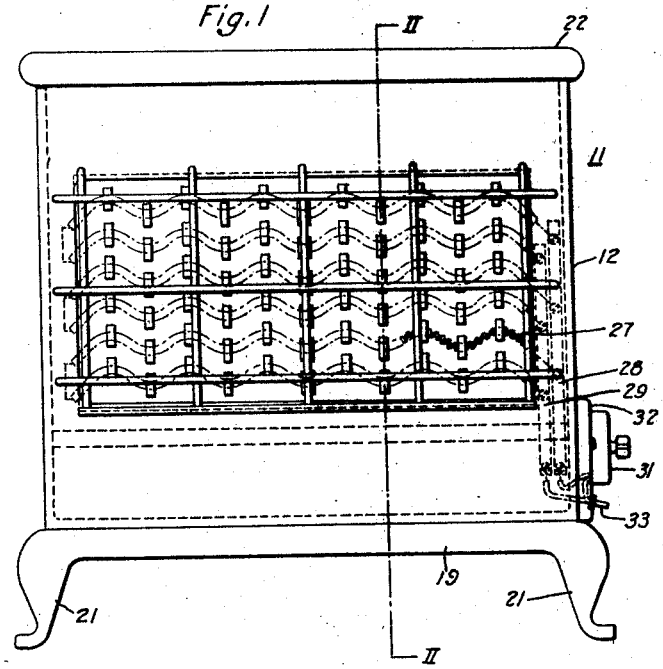
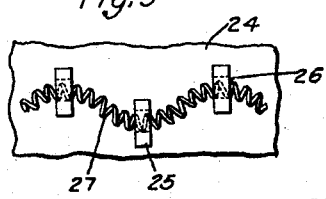
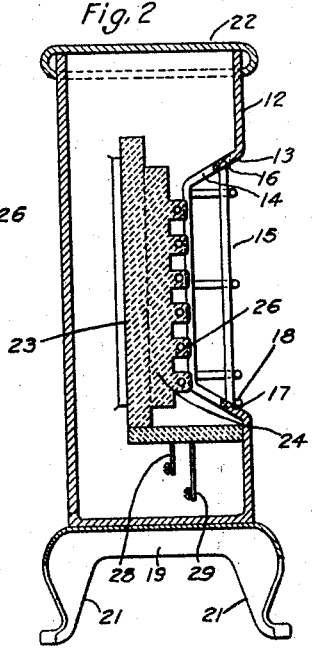
INVENTOR
Ora A. Colby
BY
Wesley Clearr
ATTORNEY Patented Sept. 29, 1925.

1,555,272

UNITED STATES PATENT OFFICE.

ORA A. COLBY, OF IRWIN, PENNSYLVANIA, ASSIGNOR TO WESTINGHOUSE ELECTRIC & MANUFACTURING COMPANY, A CORPORATION OF PENNSYLVANIA.

RADIANT HEATER.

Application filed May 24, 1923. Serial No. 641,060.

*To all whom it may concern:*

Be it known that I, ORA A. COLBY, a citizen of the United States, and a resident of Irwin, in the county of Westmoreland and State of Pennsylvania, have invented a new and useful Improvement in Radiant Heaters, of which the following is a specification.

My invention relates to electrically heated devices and particularly to electric air heaters.

One object of my invention is to provide a relatively simple and compact structure for an electric air heater of relatively large capacity.

Another object of my invention is to provide a radiant heating element that shall embody means for magnifying the effects of stray currents of air thereon.

In practicing my invention, I provide a plate of refractory electric-insulating material having a plurality of rows of spaced and laterally perforated lugs on one surface thereof. A heating element, which extends in zigzag convolutions through the openings in the lugs, comprises a relatively thin ribbon of resistor material that is wound in helical form. The heating unit comprising the plate and the heating elements are mounted in a casing and a suitable control switch is mounted thereon.

In the single sheet of drawings,

Figure 1 is a view, in front elevation, of an electric air heater comprising the device embodying my invention, Fig. 2 is a view, in vertical lateral section, therethrough, taken on the line II—II of Fig. 1 and Fig. 3 is an enlarged view, in front elevation, of a portion of a heating element embodying my invention.

An electric air heater 11 comprises a casing 12 that may be built up in any suitable or desired manner, either by the use of pressed sheet metal members or by the use of cast members, to constitute an ornamental casing having therein a radiant heating element to be hereinafter described in detail.

The casing 12 is provided with a depressed front portion 13 having an opening 14 therein. A grating 15 is located in front of the opening 14 and comprises a plurality of horizontally and of vertically extending wires or rods suitably secured together. A plurality of spaced openings 16 are provided in the top part of the depressed portion 13 into which the upper ends of the vertically extending rods of the grating 15 may fit, a plurality of spaced openings 17 being provided in the bottom part of the depressed portion 13 into which the lower ends of the vertically extending rods may fit.

A horizontally extending rod 18 is suitably secured to the vertically extending rods at the bottom thereof to limit the downward movement of the grating 15 when mounted in substantially the position illustrated in Fig. 2 of the drawings. The construction of the cooperating parts of the grating is such that it may be installed in, and removed from, its operative position in the casing by a suitable lateral and tilting motion, after the upper ends of the vertically extending rods have been placed within the openings 16.

The casing 12 is mounted on a suitable base 19 having supporting members 21 integral therewith, or secured thereto. A top portion 22 is provided and it may be secured to the casing 12 in any desired manner, all of the parts constituting the casing, base, grating and top being of such construction as to provide a heater having an ornamental and pleasing appearance.

A reflector plate 23 of a suitable refractory electric-insulating material is located within the casing 12 in back of the opening 14 and comprises an integral raised front portion 24, on the outer surface of which are mounted a plurality of rows of staggered, integral lugs 25 that are each provided with a laterally extending opening 26 therethrough.

A heating element comprises a relatively thin ribbon 27 of a suitable resistor material that is wound into helical form and extends in a zigzag or sinuous path across the front of the portion 24, substantially as illustrated in Figs. 1 and 3 of the drawing, through the openings 26 in the adjacent rows of lugs 25. Any suitable or desired number of individual heating units may be provided, but I have illustrated a total of six individual units, each one of which is of such area of cross-section and of such total length of resistor ribbon as to permit of its being directly connected to a 110 volt supply circuit.

Where it is desired to energize such an electric air heater from a 220 volt circuit, two of the individual units 27 may be connected in series circuit relation relatively to each other and I have illustrated this method of connection in Fig. 1 of the drawing. A plurality of bus bars 28 and 29 are suitably supported within the casing 12 adjacent one side thereof in any suitable or desired manner, and the right hand ends of each two adjacent resistor units are connected respectively to the bus bars 28 and 29, while the left hand ends of the same two units are electrically connected to each other.

A control switch 31 is mounted on the side of the casing 12 on a plate 32 of electric-insulating material. Terminal members 33 are mounted on the face plate 32 and suitable connections are provided between the bus bars, the control switch and the terminal pins 33 to permit of suitably energizing the respective heating units.

An electric heater of this type is intended to be used in place of the usual radiant gas heater, and it is desired to simulate the action of a radiant gas heater as much as possible. To this end, I employ a resistor ribbon having a relatively small thickness and a relatively large width in order that the radiating surface thereof may be relatively large as compared to its area of cross-section and the amount of electrical energy translated into heat, and is so selected that the heating unit will normally operate at only a dull red heat rather than at a bright red heat. As a heater of this type is subjected to the effect of stray currents of air that normally occur in any open room or space in which the heater is placed, their effect upon the heating units in momentarily cooling them is magnified by reason of the fact that the heating units are operated at a dull red heat rather than at such temperature as will cause them to become highly incandescent. The flickering effect of a gas heater is, therefore, simulated to a high degree and a pleasing effect is thereby obtained.

Various modifications and changes may be made without departing from the spirit and scope of my invention, and I desire, therefore, that only such limitations shall be placed thereon as are imposed by the prior art or are specifically set forth in the appended claims.

I claim as my invention:

1. In an electric heater, in combination, a refractory plate having a plurality of integral, spaced, laterally-perforated projections on one surface, alternate projections being located in lateral alinement, and a resistor member extending in a sinuous path through said projections.

2. In an electric heater, in combination, a refractory plate having two sets of integral, spaced, laterally-perforated projections on one surface, the projections of each set being alined both laterally and longitudinally of said plate, and the projections of one set being intermediate those of the other set in both a lateral and a longitudinal direction, and resistor members extending in a sinuous path through openings in predetermined projections of both sets.

3. In an electric air heater, in combination, a refractory resistor-supporting means, a resistor member supported thereby and of such shape in lateral section as to have a relatively large radiating surface for its area of cross-section, and means for energizing said resistor member to operate it at a dull red heat whereby the effect of stray air currents striking the resistor is to simulate a flickering gas flame.

4. In an electric air heater, in combination, an open front casing, a refractory plate in said casing adjacent said open front, and a helically wound, relatively thin and relatively wide ribbon of resistor material supported by laterally alined means integral with said plate in front of the outer surface thereof.

In testimony whereof, I have hereunto subscribed my name this 15th day of May, 1923.

ORA A. COLBY.